US005440804A

United States Patent [19]

Tamura

[11] Patent Number: 5,440,804

[45] Date of Patent: Aug. 15, 1995

[54] APPARATUS AND METHOD FOR FABRICATING HARNESS

[75] Inventor: Toshikazu Tamura, Kanazawa, Japan

[73] Assignee: Sumitomo Wiring Systems, Ltd., Japan

[21] Appl. No.: 302,116

[22] Filed: Sep. 7, 1994

[30] Foreign Application Priority Data

Oct. 1, 1993 [JP] Japan .................................. 5-269934

[51] Int. Cl.[6] .......................... H01R 43/00; H02G 1/12

[52] U.S. Cl. .......................................... 29/825; 81/9.51

[58] Field of Search .................. 29/825, 33 F; 81/9.51; 140/92.1

[56] References Cited

U.S. PATENT DOCUMENTS

| | | | |
|---|---|---|---|
| 3,973,600 | 8/1976 | Chromokos | 81/9.51 X |
| 5,063,974 | 11/1991 | Buckwitz et al. | 140/92.2 |
| 5,230,147 | 7/1993 | Asaoka et al. | 29/861 |
| 5,282,311 | 2/1994 | Tamura | 29/825 |

FOREIGN PATENT DOCUMENTS

| | | | |
|---|---|---|---|
| 2265560 | 10/1993 | United Kingdom | H01R 43/00 |

*Primary Examiner*—Carl J. Arbes

*Attorney, Agent, or Firm*—Jordan B. Bierman; Bierman and Muserlian

[57] ABSTRACT

There is disclosed an apparatus and method for fabricating harnesses wherein a wire path length adjusting mechanism (13) including a disc-shaped reel divided into an upper reel (131) and a lower reel (132) around which a wire is wound for adjusting a wire path length by varying a distance between the upper reel (131) and the lower reel (132) is provided between a cutter mechanisms (18) and an intermediate stripping mechanism (12) to adjust the wire path length between the mechanisms (12, 18) to a predetermined length. Adjustment of the wire path length to a suitable length by varying the distance between the divided reels of the disc-shaped reel facilitates positioning of the wire in a plurality of work positions, and a large diameter of the disc-shaped reel is permitted within a limited space to prevent the wire wound around the reel from being curled, whereby the harnesses which require a plurality of processes are efficiently fabricated. (FIG. 2 )

15 Claims, 15 Drawing Sheets

APPARATUS AND METHOD FOR FABRICATING HARNESS

BACKGROUND OF THE INVENTION

1. Field of the Invention

The present invention relates to an apparatus and method for fabricating harnesses by performing predetermined processing including terminating electric wires and stripping an intermediate region thereof.

2. Description of the Prior Art

Some harnesses for automotive vehicles include an insulation removed in its intermediate region for connection of a branch line to the intermediate region.

In the past, the harnesses have been fabricated by a harness fabricating apparatus for only terminating the harnesses, and the fabricated harnesses have been bundled and fed to the next step of manually stripping the intermediate region of the insulation by using a wire stripper or the like to form intermediate stripped harnesses.

However, such a method including the manual intermediate stripping process has caused variations in stripping accuracy depending upon individual abilities and, accordingly, unstabilized harness qualities. Further, a wire conveying step has been required for conveying the plurality of harnesses fabricated into a bundled form by the harness fabricating apparatus to the next step, resulting in an increased number of process steps.

To solve the foregoing problems, it has been desired to automate a series of processes from the wire terminating process to the intermediate stripping process. The applicant of the present invention has proposed a fully automatic harness fabricating apparatus as disclosed in U.S. Pat. No. 5,282,311.

FIG. 18 is a schematic side view of the harness fabricating apparatus of the above-mentioned application. The harness fabricating apparatus 300 generally comprises a straightener 310, an intermediate stripping mechanism 320, a wire path length adjusting mechanism 330, a wire feed mechanism 340, a wire guide mechanism 350, and a terminating portion 360. Operation of the respective components is controlled by a controller not shown.

An electric wire i unwound from a stock reel not shown passes through the straightener 3 10 including a plurality of upper and lower rollers 3 11 for straighten the curled wire 1, and is then stripped of an insulation in a predetermined intermediate region by the intermediate stripping mechanism 320. The stripping by the intermediate stripping mechanism 320 is carried out by grasping the wire 1 with a clamp 321, cutting into the insulation of the wire i with the forward ends of cutters 322, moving the cutters 322 to a position shown in broken lines of FIG. 18, and compressing the insulation rearwardly.

The wire path length adjusting mechanism 330 located downstream of the intermediate stripping mechanism 320 includes three rollers 331, 332, 333 around which the wire 1 is wound into an inverted U-shaped configuration. The wire path length adjusting mechanism 330 adjusts the length of the wire path between the intermediate stripping mechanism 320 and the terminating portion 360 to be described later to a predetermined length by vertically moving the middle roller 332.

The wire feed mechanism 340 drives two feed rollers 341, 342 for rotation thereof to feed the wire of a predetermined length in the direction of the arrow P. The wire guide mechanism 350 is adapted to provide slack to the wire 1 for ease of processing in the terminating portion 360 downstream thereof while guiding the wire 1 by using rollers 351, 352. The terminating portion 360 includes a front clamp 361, a cutter mechanism 362, and a rear clamp 363 which are arranged in this order, and further includes terminal crimping mechanisms (not shown) formed on opposite sides of the cutter mechanism 362 in a plane perpendicular to the plane of the drawings. In the terminating portion 360, the cutter mechanism 362 cuts off the wire 1 to a predetermined length and strips the insulation at the cut-off end, and the terminal crimping mechanism crimps a terminal to the stripped end of the wire 1. A pair of draw rollers 364 are provided upstream of the front cramp 361 for movement toward and away from each other. After the terminal crimping in the terminating portion 360, the pair of draw rollers 364 rotate so as to hold the wire 1 therebetween to feed the wire i in the P direction to haul in the slack of the wire i in the wire guide mechanism 350.

In the harness fabricating apparatus as above constructed, a series of processes from the wire terminating process including cutting of the wire 1, end stripping and terminal crimping to the intermediate stripping process are automated, and the wire path length adjusting mechanism 330 suitably adjusts the wire path length. Thus, when the wire 1 is aligned with a work position of the intermediate stripping mechanism 320, the wire 1 is simultaneously positioned at a work position of the terminating portion 360. Positioning of the wire 1 in different work positions is permitted by the single wire feeding operation, thereby providing efficient fabrication of the harnesses.

In the harness fabricating apparatus 300, the wire path length adjusting mechanism 330 for varying the wiring path length between the intermediate stripping mechanism 320 and the terminating portion 360 is adapted such that the wire 1 is wound around the three rollers 331, 332, 333 into the inverted U-shaped configuration and the middle roller 332 is vertically moved. Although the straightener 310 straightens the curled wire 1, the rollers 331, 332, 333 in the wire path length adjusting mechanism 330 curl the wire 1 again because of their small diameters. This results in errors of the length measurement by the feed roller 341 downstream of the wire path length adjusting mechanism 330 and deterioration of other working accuracy. Further, the finished harnesses which are curled create a poor appearance.

An approach to increase the diameter of the rollers 331, 332, 333 necessitates a wider space in the direction of a wire arrangement line in accordance with the increased diameter and a large-scale driving device for vertically moving one large roller, resulting in increased costs.

SUMMARY OF THE INVENTION

The present invention is intended for an apparatus for fabricating a harness by processing an electric wire. According to the present invention, the apparatus comprises: wire feed means for intermittently feeding the wire in a predetermined amount in a longitudinal direction of the wire, first processing means located upstream of the wire feed means in a feeding direction of the wire, second processing means located downstream of the wire feed means in the feeding direction of the wire, and wire path length adjusting means located between the first and second processing means for adjusting a wire path length of the wire between the first and second processing means, the wire path length adjusting means including a disc-shaped reel around which the wire is wound, the reel being divided into a plurality of divided reel elements, the wire path length being freely adjusted by varying a distance between the divided reel elements. According to the present invention, the wire path length adjusting means for freely setting the wire path length between the first and second processing means is provided therebetween. By adjusting the wire path length between the first and second processing means to a predetermined length, a position of the wire to be processed is aligned with a processing location of one of the processing means and another .position of the wire to be processed is simultaneously aligned with a processing location of the other processing means. The wire feed means feeds the wire once in corresponding relation to a distance between the different processing locations, thereby to achieve the positioning in the first processing means and the positioning in the second processing means at the same time. This reduces the number of wire feedings by the wire feed mechanism and the stand-by time between stop of the feeding and start of the next processing, accomplishing efficient harness fabrication.

The wire path length adjusting mechanism is adapted such that the disc-shaped reel is divided into a plurality of reels around which the wire is wound and the path length is adjusted by varying the distance between the reels, thereby readily adjusting the wire path length. A large diameter of the disc-shaped reel permitted within a limited space prevents the wire wound around the reel from being curled, allowing high-accuracy harness processing.

Preferably, the first processing means is an intermediate stripping mechanism for stripping an insulation from the wire in an intermediate region of the wire, and the second processing means is a cutter mechanism for cutting off the wire fed from the wire feed means.

The wire path length between the intermediate stripping mechanism and the cutter mechanism of the apparatus is adjusted by the wire path length adjusting means, and the wire is positioned in processing locations of both of the mechanisms at the same time.

Preferably, the first processing means is a marking mechanism for marking an outer peripheral surface of the wire, and the second processing means is a cutter mechanism for cutting off the wire fed from the wire feed means.

The wire path length between the marking mechanism and the cutter mechanism of the apparatus is adjusted by the wire path length adjusting means, and the wire is positioned in processing locations of both of the mechanisms at the same time.

The present invention is also intended for a method of fabricating a harness. According to the present invention, the method comprises the steps of: intermittently feeding a wire in a predetermined amount in a longitudinal direction thereof by wire feed means, performing a first processing on the wire by first processing means located upstream of the wire feed means in a feeding direction of the wire, and .performing a second processing on the wire by second processing means located downstream of the wire feed means in the feeding direction of the wire, wherein a wire path length of the wire between the first processing means and the second processing means is adjusted by wire path length adjusting means provided between the first and second processing means so as to simultaneously execute positioning of the wire in the first processing means and positioning of the wire in the second processing means, for execution of the first processing and/or the second processing, wherein the wire path length adjusting means includes a disc-shaped reel divided into a plurality of divided reel elements around which the wire is wound, and the wire path length is adjusted by varying a distance between the divided reel elements.

It is an object of the present invention to provide an apparatus and method for effectively fabricating harnesses which are not curled but of a stabilized quality within a limited space.

These and other objects, features, aspects and advantages of the present invention will become more apparent from the following detailed description of the present invention when taken in conjunction with the accompanying drawings.

DESCRIPTION OF THE PREFERRED EMBODIMENTS

A preferred embodiment according to the present invention will be described in detail hereinafter with reference to the drawings. The technical scope of the present invention is not limited by the following description.

<Construction of Harness Fabricating Apparatus>

Figure 1:
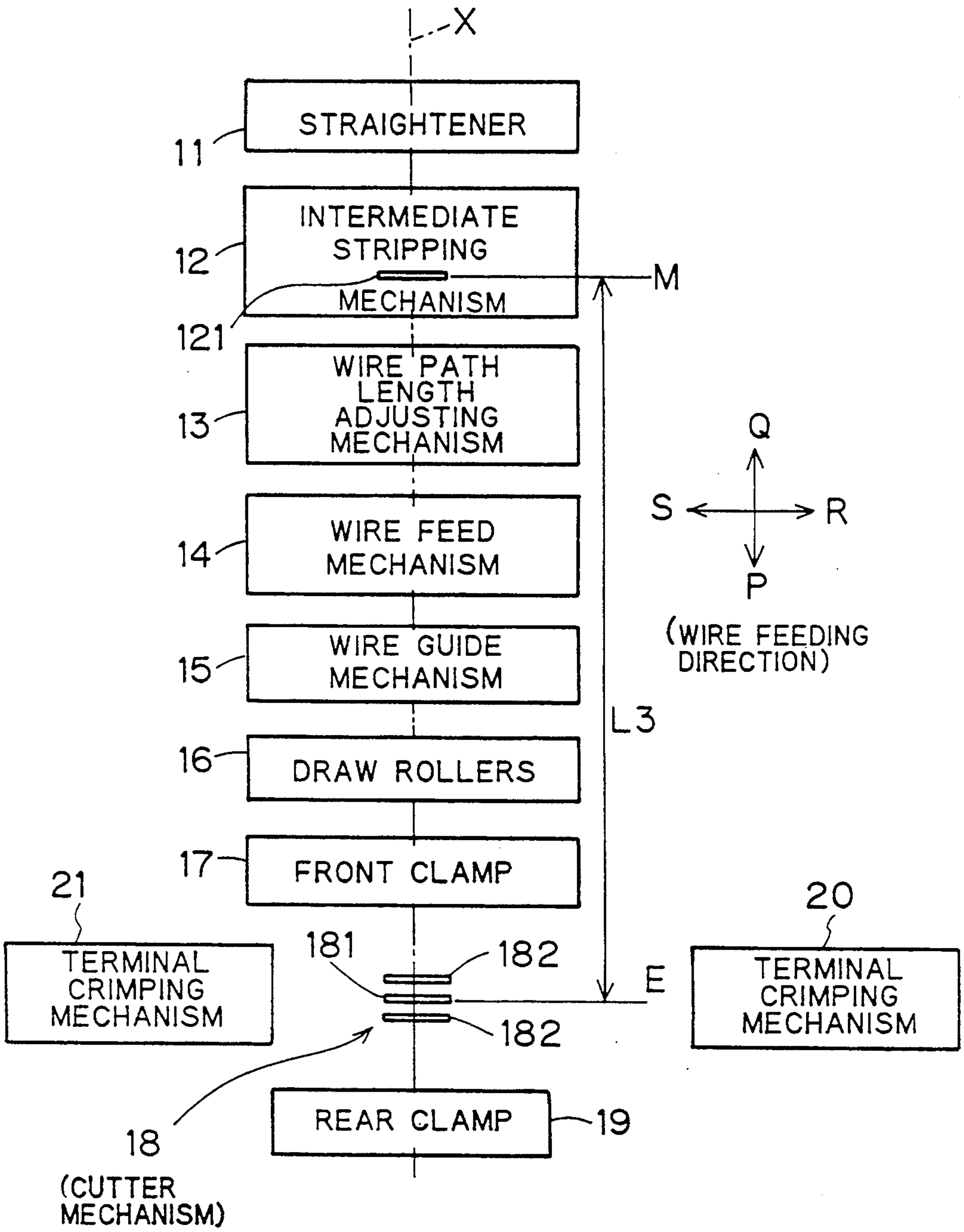
FIG. 1 is a schematic arrangement plan of a harness fabricating apparatus of a first preferred embodiment according to the present invention.
Figure 2:
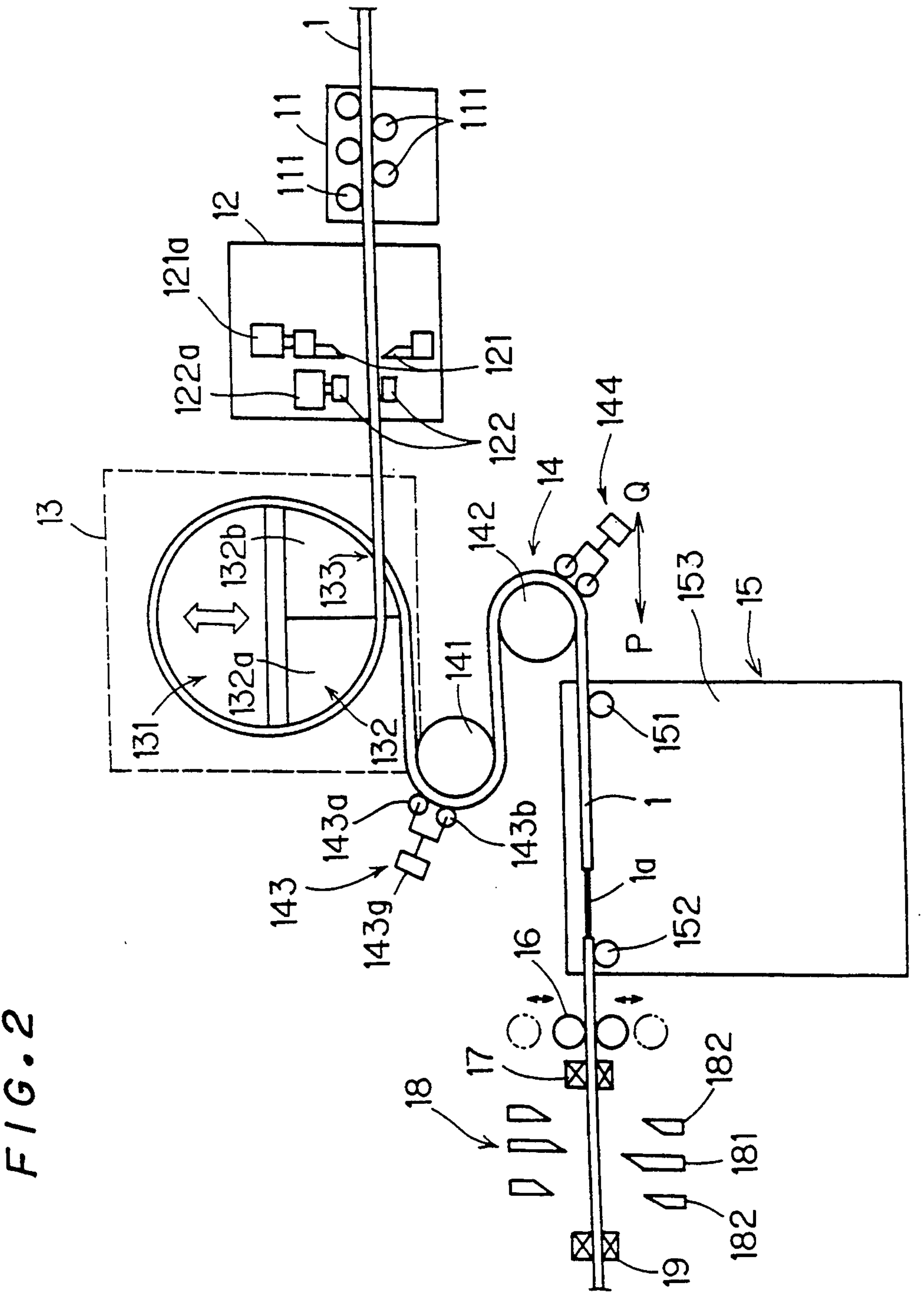
FIG. 2 is a schematic side view of the harness fabricating apparatus of FIG. 1.
Figure 3:
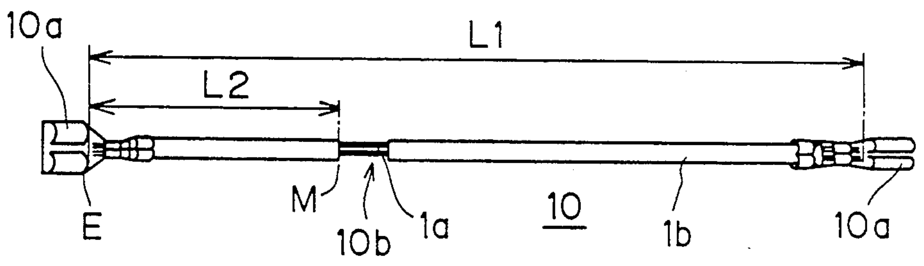
FIG. 3 illustrates a harness fabricated by the harness fabricating apparatus of FIG. 1.

Description will now be given on the general construction of a harness fabricating apparatus according to the present invention. FIG. 1 is a schematic arrangement plan of the harness fabricating apparatus of a first preferred embodiment according to the present invention. FIG. 2 is a schematic side view of the harness fabricating apparatus of FIG. 1. FIG. 3 illustrates an exemplary harness 10 fabricated by the harness fabricating apparatus of FIG. 1.

Referring to FIGS. 1 and 2, the harness fabricating apparatus of the present invention comprises a straightener 11, an intermediate stripping mechanism (first processing means) 12, a wire path length adjusting mechanism 13, a wire feed mechanism 14, a wire guide mechanism 15, draw rollers 16, a front clamp 17, a cutter mechanism (second processing means) 18, and a rear clamp 19 which are arranged in this order along a wire arrangement line X (FIG. 1). Terminal crimping mechanisms 20, 21 are provided on opposite sides of the cutter mechanism 18. Operation of the respective components is controlled by a controller not shown.

The harness fabricating apparatus having such an arrangement performs various processes upon the wire 1 to sequentially fabricate the harnesses 10 having terminals 10*a* crimped to opposite ends thereof and an intermediate stripped portion 10*b* in which an outer peripheral insulation 1*b* is stripped to expose a core wire 1*a*, as finally shown in FIG. 3.

Construction of the respective components of the harness fabricating apparatus is discussed below. The straightener 11 includes a plurality of upper and lower rollers 111 arranged along the wire arrangement line X. The plurality of rollers 111 permit the wire 1 unwound from a stock reel not shown to pass therebetween to straighten the curled wire 1.

The intermediate stripping mechanism 12 includes a clamp 122 driven by a drive means such as a cylinder 122*a* for releasably grasping the wire i on the wire arrangement line X, and a pair of cutters 121 for cutting in the outer peripheral insulation 1*b* of the wire 1. The cutters 121 are driven for opening and closing by a drive means including a cylinder 121*a* and are permitted to move along the wire arrangement line X.

The wire path length adjusting mechanism 13 is provided for adjusting the wire path length from the intermediate stripping mechanism 12 to the cutter mechanism 18 to be described later and is shaped so that a generally circular reel is transversely halved. The wire 1 is wound around outer peripheries of an upper reel 131 serving as a second divided reel element and a lower reel 132 serving as a first divided reel element. The wire path length is freely adjusted by adjusting the distance between the upper and lower reels 131 and 132.

Figure 5:
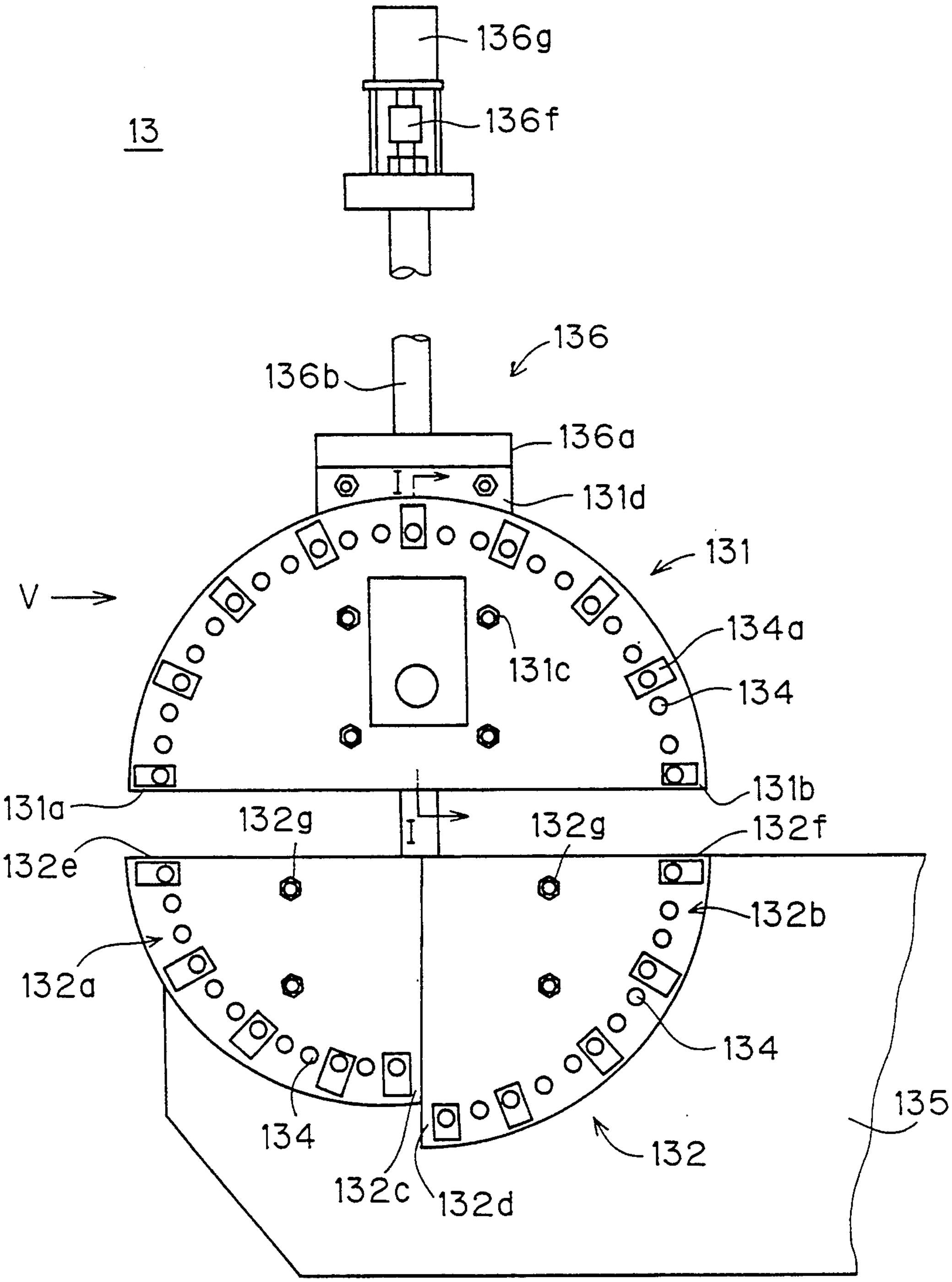
FIG. 5 is a detailed front elevation of a wire path length adjusting mechanism.
Figure 6:
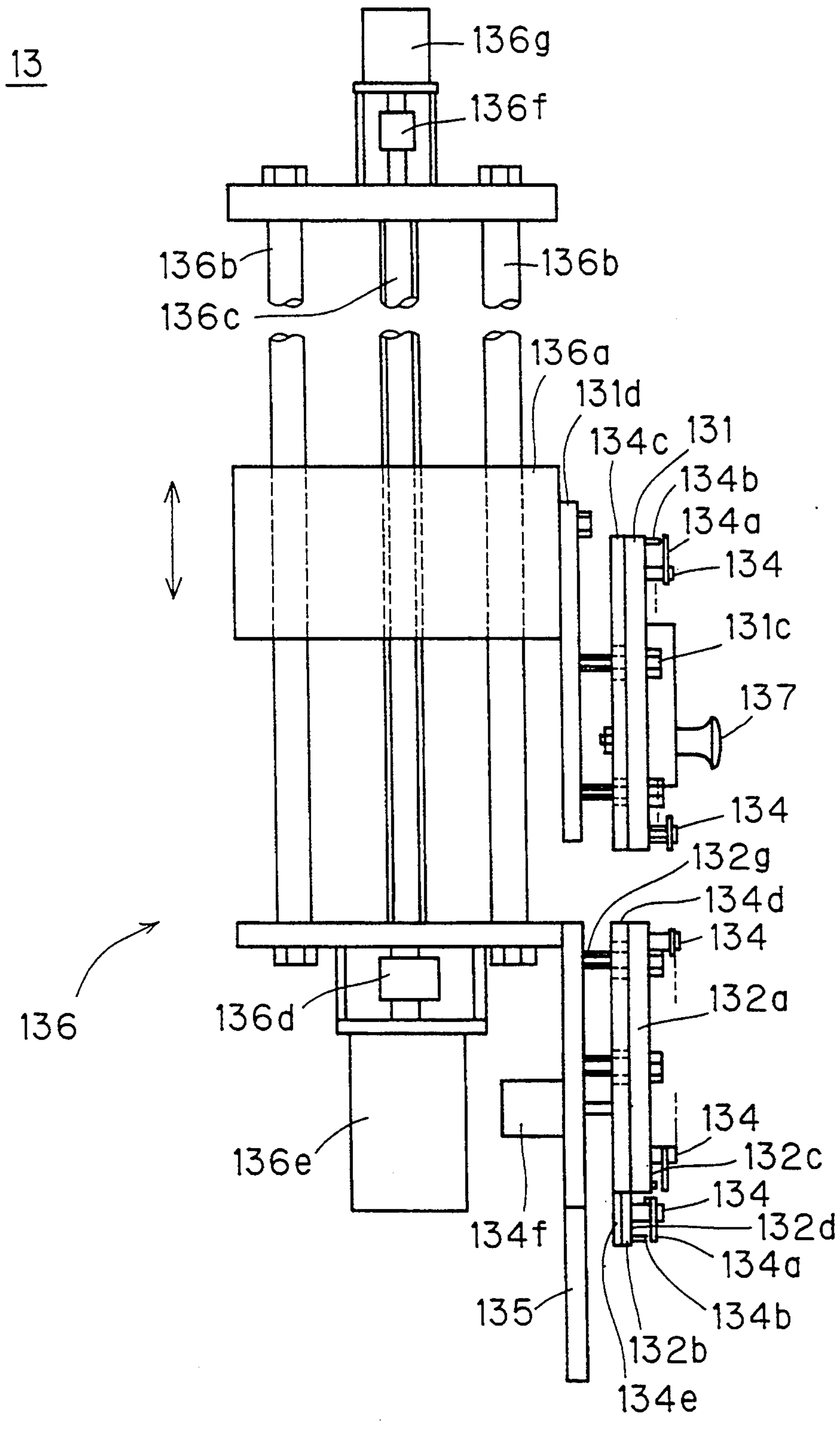
FIG. 6 is a side view of the wire path length adjusting mechanism as viewed in the direction of the arrow V of FIG. 5.

FIG. 5 is a detailed front elevation of major portions of the wire path length adjusting mechanism 13. FIG. 6 is a side view as viewed in the direction of the arrow V of FIG. 5. For the purpose of illustration, the wire 1 is not shown in FIGS. 5 and 6, and some of a plurality of bearings 134 are shown in FIG. 6.

As shown in FIG. 5, the lower reel 132 includes an inlet reel 132*a* to which the wire 1 is fed, and an outlet reel 132*b* from which the wire 1 is fed to the wire feed mechanism 14 downstream thereof. The inlet reel 132*a*, the outlet reel 132*b*, and the upper reel 131 are provided with a multiplicity of small bearings 134 arranged along their outer peripheries. The wire 1 is wound on the outside of the multiplicity of bearings 134 so as to be fed smoothly. To prevent the wire 1 directed to the inlet reel 132*a* from contacting the wire 1 directed outwardly from the outlet reel 132*b* at an intersection 133 thereof (FIG. 2), the inlet reel 132*a* has a radius slightly smaller than that of the outlet reel 132*b*, and a wire inlet surface 132*c* of the inlet reel 132*a* is in an extended position relative to a wire outlet surface 132*d* of the outlet reel 132*b* as shown in FIG. 6 so that the wire 1 intersects itself in three dimensions at the intersection 133. A wire outlet surface 132*e* of the inlet reel 132*a* and a wire inlet surface 131*a* of the upper reel 131 are tapered so as to lie substantially in the same plane, whereas a wire outlet surface 131*b* of the upper reel 131 and a wire inlet surface 132*f* of the outlet reel 132*b* are tapered so as to lie substantially in the same plane.

The lower reel 132 is fixed on a machine body 135 with bolts 132*g* in predetermined spaced relation (FIG. 6). The upper reel 131 is fixed on a moving member 131*d* with bolts 131*c* in predetermined spaced relation. The moving member 131*d* is vertically moved by a drive 136 to be described later to vary the distance between the upper and lower reels 131 and 132, thereby allowing adjustment of the wire path length.

The drive 136 includes a rack 136*a* for holding the moving member 131*d* and vertically moved by a screw feed mechanism, as shown in FIG. 6. The rack 136*a* is guided for vertical movement by two guide rods 136*b* and is in threaded engagement with a threaded shaft 136*c* extending vertically intermediate the guide positions of the guide rods 136*b*. The threaded shaft 136*c* is driven for rotation by a drive motor 136*e* connected through a joint 136*d*, and the rack 136*a* vertically moves a predetermined amount by the screw feed action in accordance with the amount of rotation of the threaded shaft 136*c*.

An encoder 136*g* is connected to the top of the threaded shaft 136*c* through a joint 136*f* and provides an output signal to a controller not shown, which in turn controls the amount of rotation of the threaded shaft 136*c*, that is, the amount of vertical movement of the rack 136*a*.

Referring again to FIG. 5, restricting members 134*a* are attached to the heads of some of the bearings 134 in constantly spaced relation to prevent the wire 1 wound on the outside of the plurality of bearings 134 from falling off the bearings 134 during the operation of the apparatus. As shown in FIG. 6, restricting pins 134*b* extend from pin holding plates 134*c*, 134*d*, 134*e* on the back of the reels 131, 132*a*, 132*b* and slidably pass through pin through holes of the reels 131, 132*a*, 132*b* to project into abutment against the rear of the restricting members 134*a*. This securely prevents the wire 1 from falling off the bearings 134.

Figure 7:
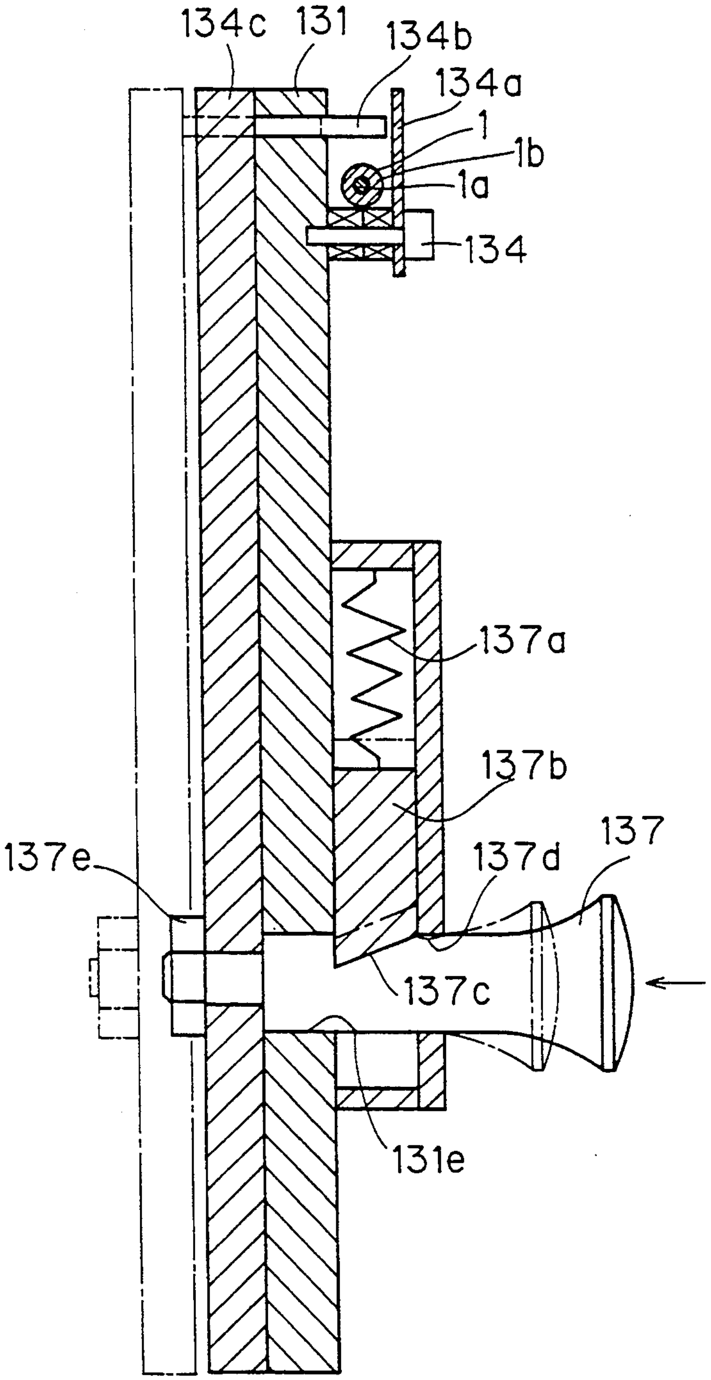
FIG. 7 is a sectional view of the wire path length adjusting mechanism taken along the line I—I of FIG. 5.

FIG. 7 is a sectional view taken along the line I—I of FIG. 5 and illustrates a mechanism for moving (extending and retracting) the restricting pins 134*b* in the upper reel 131.

A handle 137 is slidably received in a through hole 131*e* of the upper reel 131, and the pin holding plate 134*c* is fixed to the received end of the handle 137 with a nut 137*e*. Upon pulling the handle 137, the pin holding plate 134*c* abuts against the rear surface of the upper reel 131, and the restricting pins 134*b* are extended from the surface of the upper reel 131 into substantial abutment with the rear surface of the restricting members 134*a*. At this time, a front end of a claw 137*b* urged by a spring 137*a* engages a first notch 137*c* of the handle 137, and the handle 137 is positioned in an extended condition. Conversely, upon pushing the handle 137, the pin holding plate 134c is removed from the rear surface of the upper reel 131 and the restricting pins 134b are retracted (shown in dashed-and-doted phantom). At the same time, the claw 137b is pushed up into engagement with a small second notch 137d and is then positioned in that condition. This facilitates the restriction and release of the wire 1 in a circumferential direction of the upper reel 131, thereby permitting exchange of the wire 1 without difficulty.

The pin holding plates 134d, 134e of the lower reel 132 are not moved by the handle 137 but by an actuator 134f (FIG. 6). Similarly, the restricting pins 134b are automatically extended and retracted.

Figure 4:
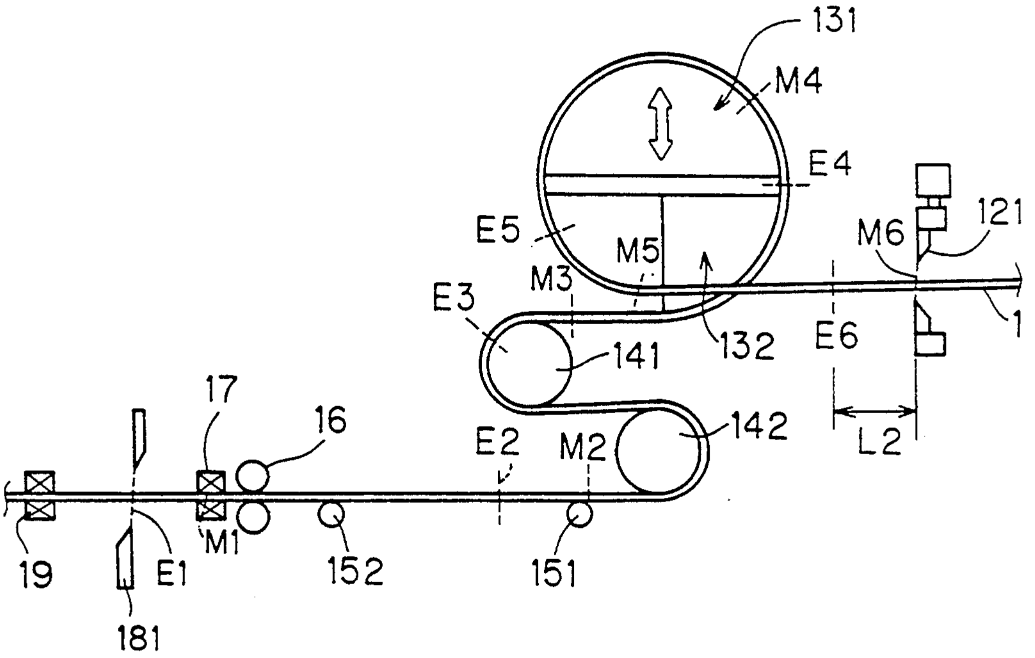
FIG. 4 is a conceptual view for delineating a wire path length setting method in the harness fabricating apparatus of FIG. 1.

In the wire path length adjusting mechanism 13 as above constructed, the position of the upper reel 13 1 is determined so that the distance between the upper and lower reels 131 and 132 satisfies: $L3=nL1+L2$ ($n=0, 1, 2, 3, \ldots$) where L1 is a wire dimension (cut-off dimension) of the fabricated harness 10 (FIG. 3), L2 is a dimension between a wire end of the harness 10 and one end of an intermediate removal region of the harness 10, and L3 is a distance (wire arrangement distance) from a cut-in position M for the intermediate stripping cutters 121 to a cut-off position E for cut-off cutters 181 along the wire arrangement line X (FIG. 1). FIG. 4 illustrates relation between the cut-off positions E and the cut-in positions M when $n=5$, for example, with the intermediate stripped portions coated for the purpose of illustration. For ease of understanding, the cut-off positions E and the cut-in positions M are numbered in the order of increasing distance from the cutter mechanism 18. E1 to E6 represent expected cut-off positions for the cutters 181 and M1 to M6 represent cut-in positions for the cutters 121 of the intermediate stripping mechanism 12 in order.

When the expected cut-off position En of the wire 1 is located in corresponding relation to the forward ends of the cut-off cutters 181, one end of an expected intermediate removal region (the cut-in position $M(n+5)$) of the wire 1 is located in corresponding relation to the forward ends of the intermediate stripping cutters 121. The cut-off operation and the intermediate stripping operation can be executed simultaneously, and the feeding step of the wire 1 is dot required therebetween, thereby allowing efficient harness fabrication.

Referring again to FIG. 2, the wire feed mechanism 14 includes a freely rotatable measuring roller 141 and a freely rotatable feed roller 142. When the rollers 141, 142 are driven for rotation by a drive means not shown, with the wire 1 wound around the rollers 141, 142 in an S-shaped configuration, the wire 1 is fed longitudinally (along the wire arrangement line X of FIG. 1) in the direction of the arrow P (referred to as a "wire feeding direction P").

Figure 9:
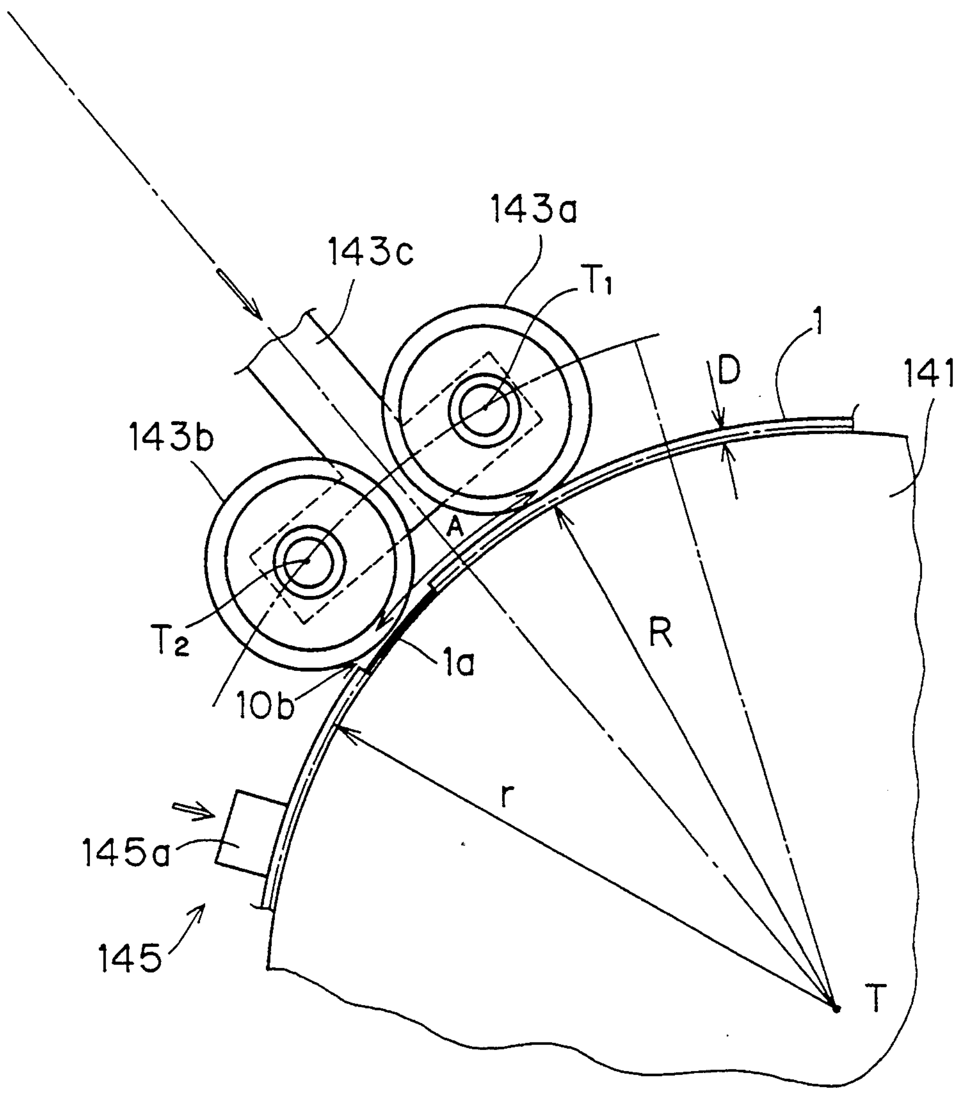
FIG. 9 illustrates restriction of the amount of movement of a presser roller by the pressure contact device of FIG. 8.

In the wire feed mechanism 14 as above constructed, the feed of the wire 1 is controlled in a manner to be described below. As schematically shown in FIG. 9, the radius of curvature r of the core wire 1a of the wire 1 fed around the measuring roller 141 is generally expressed as: $r=R+D/2$ where R is the radius of the measuring roller 141 and D is the diameter of the wire 1. Therefore, the feed Lr of the wire 1 when the measuring roller 141 makes x rotations is $Lr=2r\pi x=(2R+D)\pi x$, which is modified into $x=Lr/(2R+D)\pi$. Thus, x rotations of the measuring roller 141 precisely provides the feed Lr of the wire 1.

Figure 8:
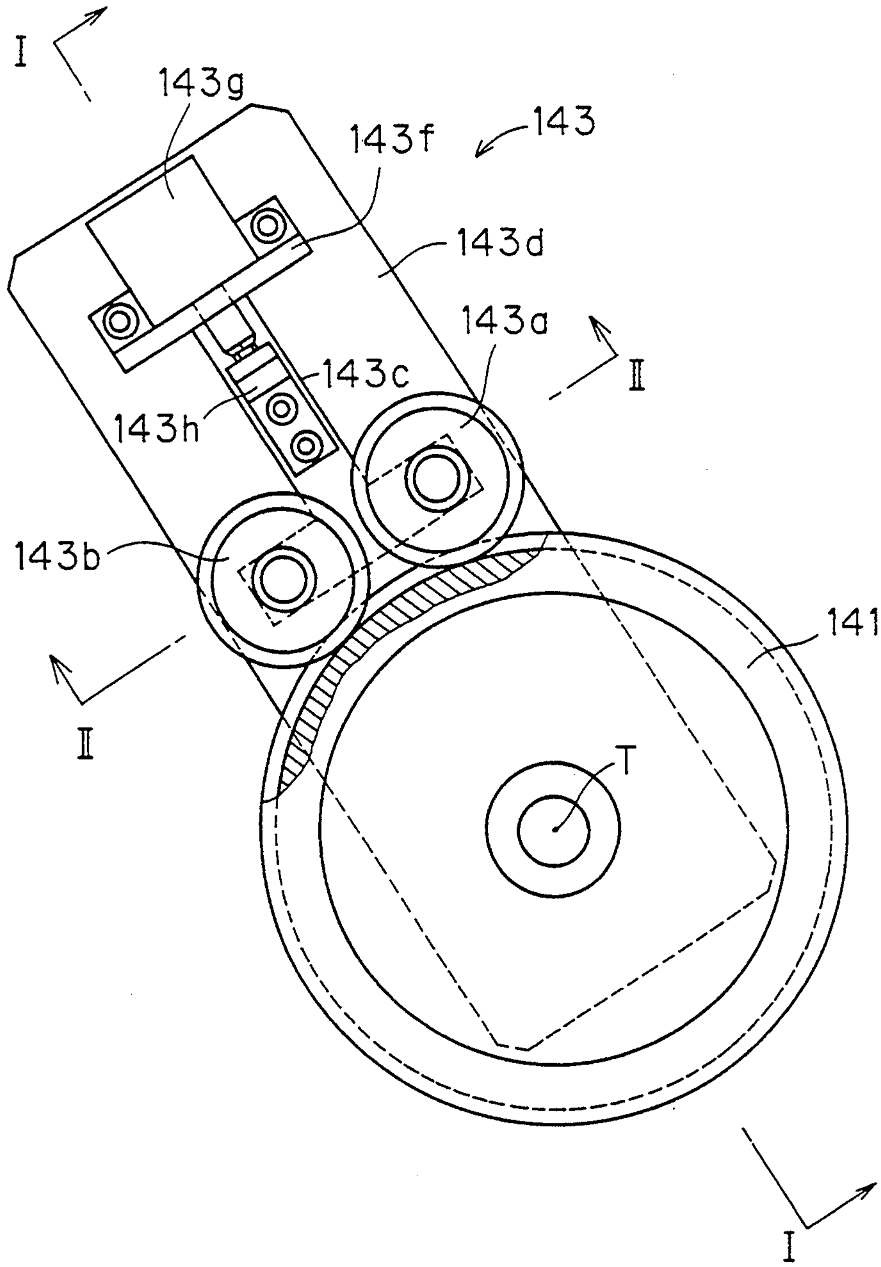
FIG. 8 is a plan view of a pressure contact device for a measuring roller.

A pressure contact device 143 is provided to prevent slip between the measuring roller 141 and the wire 1. FIG. 8 is a detailed plan view of the pressure contact device 143 which includes two presser rollers 143a, 143b rotatably held by a retentive member 143c. The retentive member 143c is slidably fitted in a groove (not shown) formed in a base plate 143d and is permitted to restrictedly move only toward the center T of the measuring roller 141.

An air cylinder 143g is mounted on an L-shaped fixture 143f fixed on the base plate 143d and urges the retentive member 143c through the fixture 143h with a constant force toward the center T of the measuring roller 141. The presser rollers 143a, 143b are mounted symmetrically with respect to the moving direction of the retentive member 143c (toward the center T of the measuring roller 141), and have the centers of rotation T1, T2, respectively, which are equidistant from the center T of the measuring roller 141 (FIG. 9).

In such an arrangement, if an intermediate stripped portion 10b of the wire 1 comes to the position of a pressing portion of one Of the presser rollers (the presser roller 143b in FIG. 9), the other presser roller (143a) abuts against the insulation 1b of the wire 1. In addition, since the retentive member 143c restrictedly moves only toward the center T of the measuring roller 141, the movement of the presser roller 143b toward the measuring roller 141 is restricted to prevent the presser roller 143b from contacting the core wire 1a.

In this manner, one of the presser rollers 143a (143b) restricts the amount of movement of the other presser roller 143b (143a) so that the other roller 143b (143a) does not contact the core wire 1a. Thus the core wire 1a is not damaged by the urging force of the presser rollers.

If a plurality of intermediate stripped portions 10b are provided within a short section so that a spacing between adjacent intermediate stripped portions 10b substantially equals a spacing between abutment portions of the presser rollers 143a and 143b against the measuring roller 141, the presser rollers 143a and 143b sometimes press against the intermediate stripped portions 10b simultaneously. In this case, the above-described position restriction is not effected and the presser rollers 143a, 143b simultaneously urge the core wire 1a to damage the core wire 1a. It is necessary that a distance A between the abutment portions of the presser rollers 143a and 143b against the measuring roller 141 is different from the length L of the insulation 1b between two adjacent intermediate stripped portions 10b. Preferably, $L \geqq A+\alpha (\alpha>0)$.

As above stated, x ($=Lr/(2R+D)\pi$) rotations of the measuring roller 141 provides the feed Lr of the wire 1. It is apparent from the equation of the feed Lr that variations in diameter D resulting from changes of the types of the wire 1 vary the feed Lr. The diameter D varies finely depending upon deformation of the insulation urged by the presser rollers 143a and 143b, resulting in variations in feed Lr. To achieve high-accuracy feeding of the wire 1, the varied value of D may be inputted to the controller upon each measurement thereof, which requires labor and causes difficulty in manually measuring the wire i which is complicatedly deformed while being fed. A solution of the problem is, for example, the provision of a sensor 145 immediately downstream of the presser roller 143b for automatically measuring the diameter of the wire 1 as shown in FIG. 9. Control of the feed, with the detected value D applied to the controller, enables a predetermined amount of wire feed correctly without manual operation.

Although the sensor 145 is adapted so that a contact element 145*a* is urged toward the wire 1 to measure the moving amount in this case, other non-contact sensors may be used.

The pressure contact device 144 for the feed roller 142 is similar in construction to the pressure contact device 143. If the measuring roller 141 provides a sufficient feeding force, the measuring roller 141 functions also as the feed roller, and the pressure contact device 144 and the feed roller 142 may be omitted.

Referring again to FIG. 2, the wire guide mechanism 15 includes a body 153 and two spaced guide rollers 15 1, 152 rotatably mounted on an upper portion of the body 153. Both of the guide rollers 151 and 152 provide slack to the wire 1 delivered from the wire feed mechanism 14 to cause the wire i to wait until the draw rollers 16 to be described later feed the wire 1.

The pair of draw rollers 16 are driven for movement toward and away from each other and adapted to hold the wire 1 on the wire arrangement line X (FIG. 1) therebetween. The pair of draw rollers 16 are driven for rotation in opposite directions by a drive means not shown while holding the wire i therebetween, to deliver the wire 1 in the wire feeding direction P.

The front clamp 17 is adapted to releasably grasp the wire i on the wire arrangement line X and is permitted to freely move in the horizontal plane including the wire arrangement line X by a drive means not shown.

The cutter mechanism 18 includes the pair of cut-off cutters 181 for cutting off the wire 1 on the wire arrangement line X, and two pairs of cut-in cutters 182 on front and rear sides of the cut-off cutters 181 for cutting in the insulation on the outer periphery of the wire 1. The cutter mechanism 18 is adapted such that the cutters 181, 182 are driven for opening and closing in synchronism with each other by a drive means not shown.

The rear clamp 19 is adapted to releasably grasp the wire 1 on the wire arrangement line X and is permitted to freely .move in the horizontal plane including the wire arrangement line X by a drive means not shown.

A wire terminating mechanism is formed by the front clamp 17, the cutter mechanism 18, the rear clamp 19, and the terminal crimping mechanisms 20, 21 (FIG. 1) on the right and left sides thereof.

<Operation of Harness Fabricating Apparatus>

Figure 10:
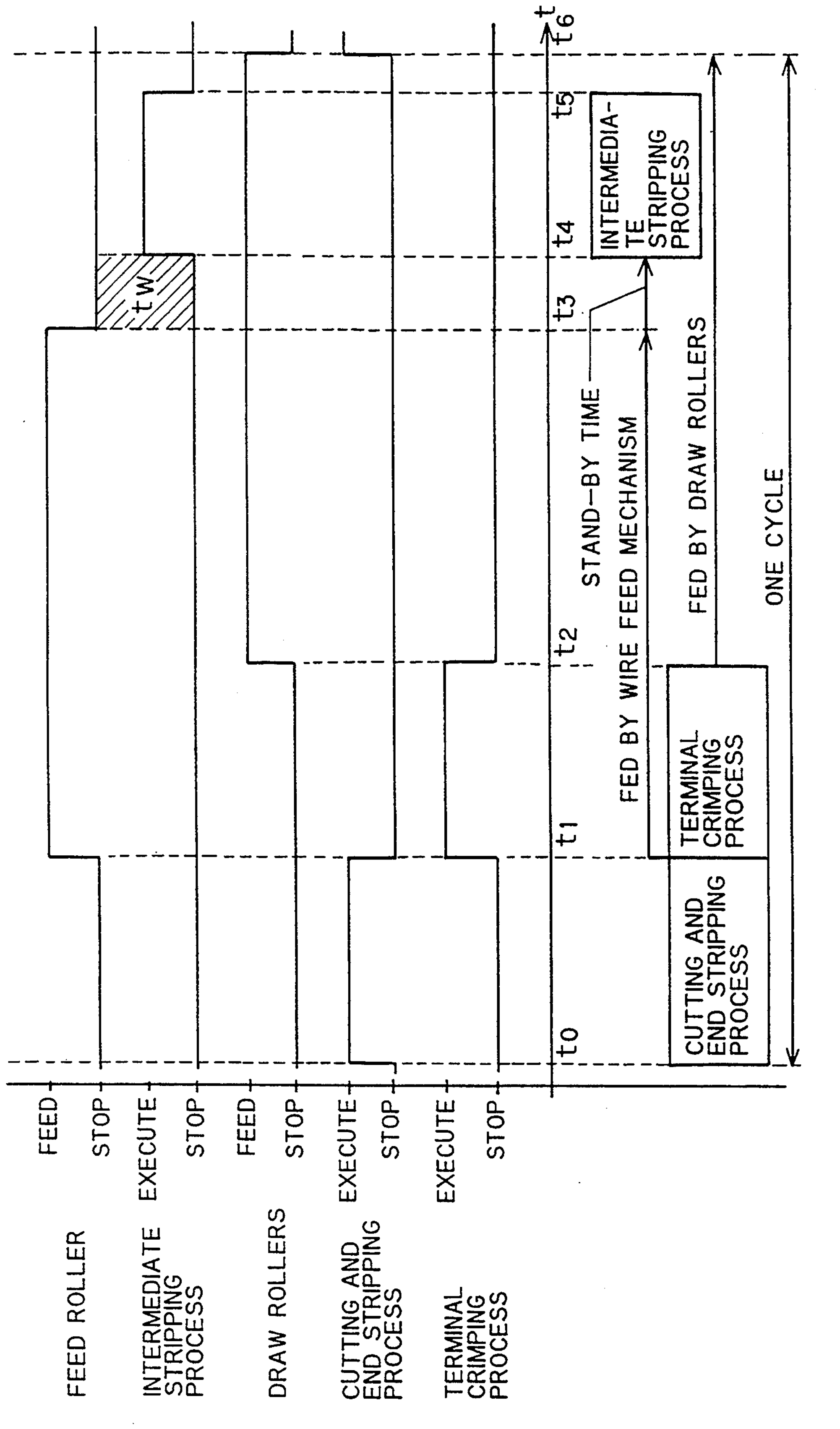
FIG. 10 is a timing chart for delineating operation of the harness fabricating apparatus of FIG. 1.

Operation of the harness fabricating apparatus will be discussed below with reference to the timing chart of FIG. 10.

(1) Initially, the wire 1 is set on the apparatus prior to start of the operation. The wire 1 is unwound from the stock reel not shown and passed between the plurality of rollers 111 of the straightener 11, between the pair of cutters 121 of the intermediate stripping mechanism 12, and through the clamp 122. Then the wire 1 is wound around the upper and lower reels 131, 132 of the wire path length adjusting mechanism 13 and, in turn, wound around the measuring roller 141 and feed roller 142 into S-shaped configuration. The wire 1 is then passed on the two guide rollers 151, 152 of the wire guide mechanism, between the pair of draw rollers 16, and through the front clamp 17. The wire 1 is finally passed between the cutters 181, 182 and through the rear clamp 19. At this time, the clamp 122 of the intermediate stripping mechanism 12 and the clamps 17, 19 of the wire terminating mechanism are in grasp-released relation to the wire 1. The pair of draw rollers 16 are separated from each other in hold-released relation to the wire 1 as shown in phantom of FIG. 2.

The wire path length adjusting mechanism 13 sets the position of the upper reel 131 so as to satisfy: $L3=nL1+L2$ (n=0, 1, 2, 3, . . . ) (FIG. 3) where L3 is the distance (wire arrangement distance) from the cut-in position M for the intermediate stripping cutters 121 to the cut-off position E for the cut-off cutters 181 along the wire arrangement line X (FIG. 1).

Figure 11:
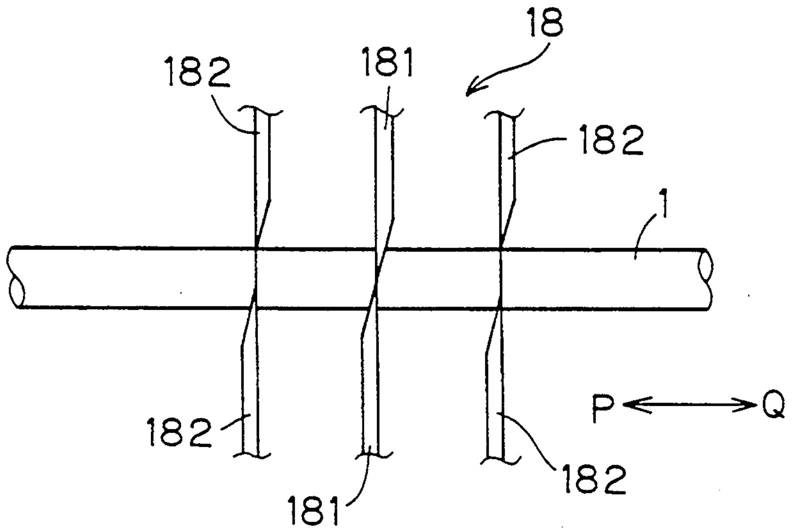
FIGS. 11 and 12 illustrate a wire cutting process in the harness fabricating apparatus of FIG. 1.
Figure 12:
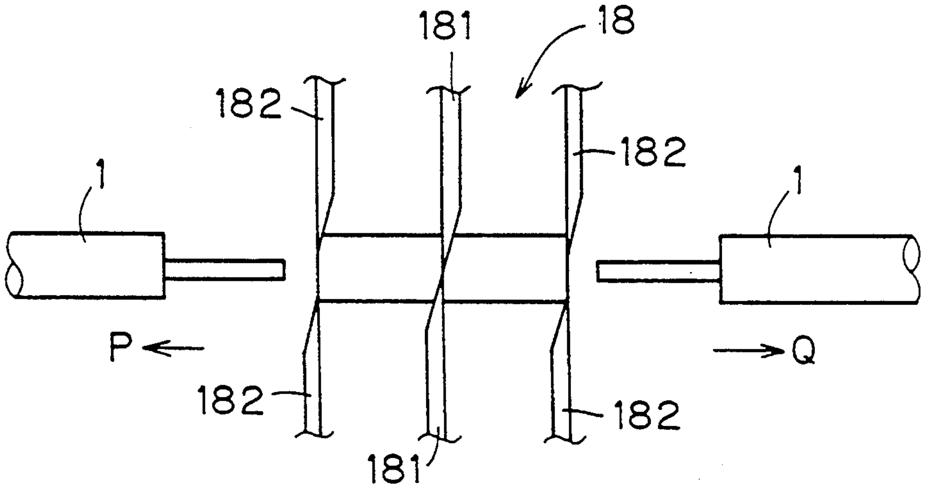

(2) An operation start command is applied to the controller not shown in such conditions. Then, during the time interval between t0 and t1 as shown in FIG. 10, the wire 1 is grasped by the front clamp 17 and the rear clamp 19, and the cut-off cutters 181 and cut-in cutters 182 are closed in synchronism with each other as shown in FIG. 11 to cut off the wire 1 at the expected cut-off position by the cut-off cutters 181 and to cut in the insulation 1*b* of the wire 1 on opposite sides of the cut-off position by the cut-in cutters 182. With the cut-in cutters 182 cut in the insulation 1*b*, the front clamp 17 moves in the direction Q opposite from the wire feeding direction P (FIG. 12) to strip the insulation 1*b* of the wire 1 (residual wire 1) grasped by the clamp 17 at its downstream end with respect to the wire feeding direction P. In parallel with the operation of the front clamp 17, the rear clamp 19 moves in the P direction to strip the insulation 1*b* of the wire 1 (cut-off wire 1) grasped by the clamp 19 at its upstream end with respect to the wire feeding direction P (cutting and end stripping process).

Figure 13:
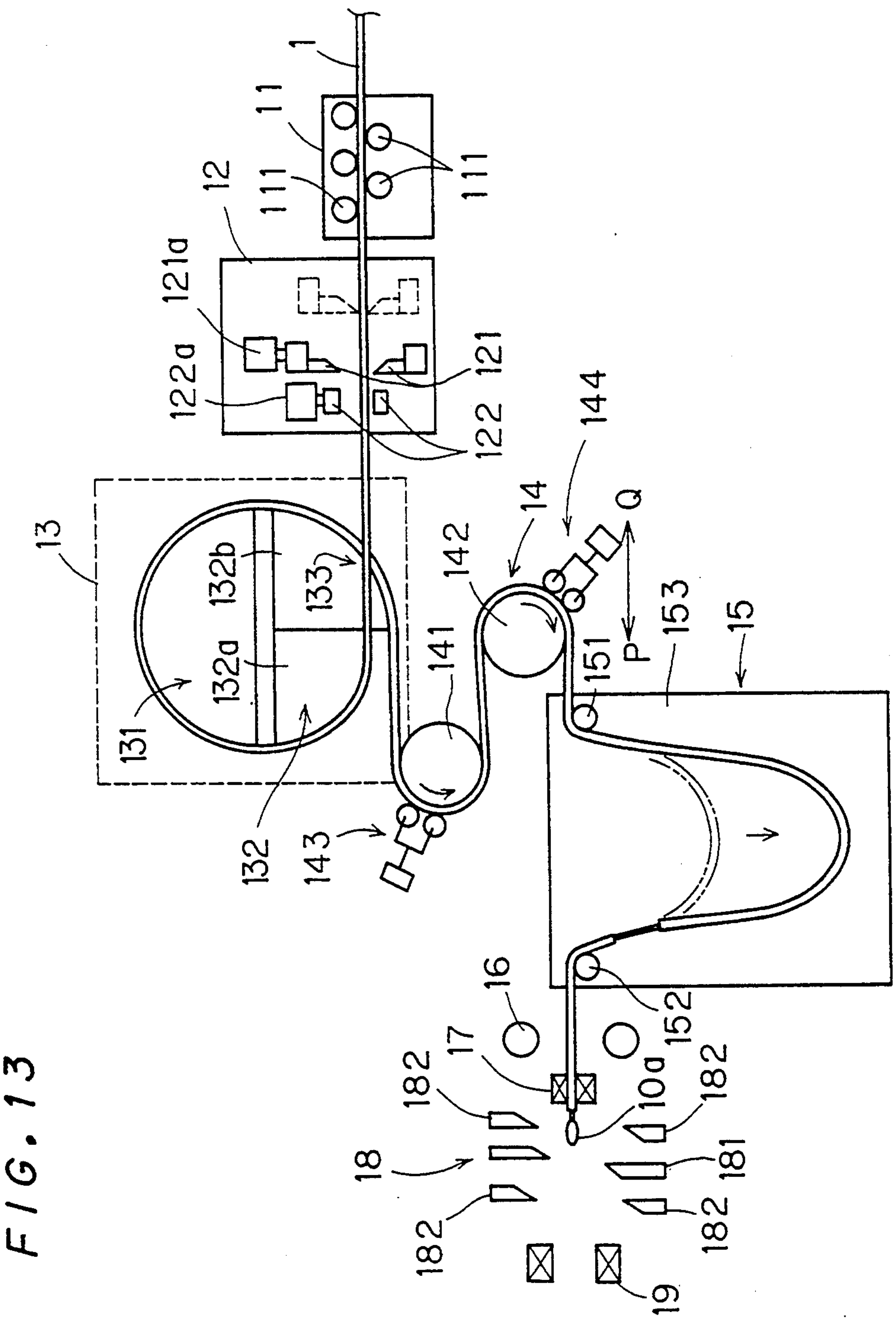
FIGS. 13 and 14 are side views for delineating operation of the harness fabricating apparatus of FIG. 1.

(3) At the time t1, the measuring roller 141 and feed roller 142 start feeding the wire 1 as shown in FIG. 13. In parallel with the feed, terminal crimping is carried out during the time interval between t1 and 12. The front clamp 17 grasping the residual wire 1 moves rightwardly in the direction of the arrow R of FIG. 1 toward the terminal crimping mechanism 20, and the terminal crimping mechanism 20 in turn crimps the terminal 10*a* to the stripped end of the residual wire 1. Thereafter the front clamp 17 moves leftwardly in the direction of the arrow S of FIG. 1 to place the residual wire .1 again on the wire arrangement line X. In parallel with the operation of the front clamp 17, the rear clamp 19 moves leftwardly in the direction of the arrow S of FIG. 1 toward the terminal crimping mechanism 21, and the terminal crimping mechanism 21 in turn crimps the terminal 10*a* to the stripped end of the cut-off wire 1. Thereafter, the rear clamp 19 releases the cut-off wire 1 to discharge the cut-off wire 1 to a predetermined discharge portion, and then returns to the original position on the wire arrangement line X. During the terminal crimping, the wire 1 delivered by the wire feed mechanism 14 forms slack between the guide rollers 151, 152 of the wire guide mechanism 15 to allow lateral movement of the residual wire 1.

Figure 14:
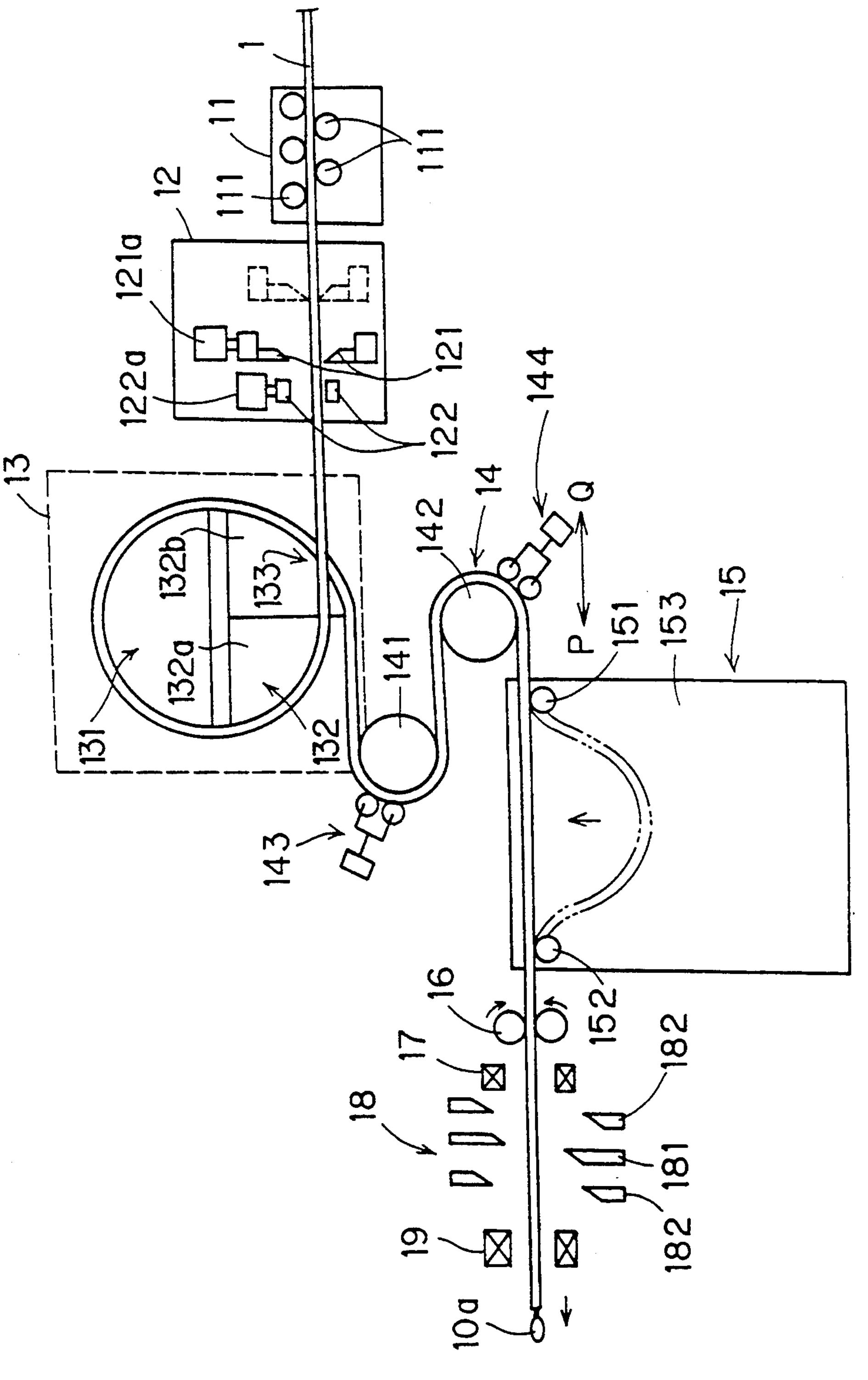

(4) At the time 12 at which the terminal crimping and discharge are completed, the grasp of the wire 1 by the front clamp 17 is released, and the draw rollers 16 are driven for rotation while holding the residual wire 1 therebetween to start feeding the residual wire 1, as shown in FIG. 14.

At a time t3, the wire 1 is fed an amount corresponding to the cut-off size L1 by means of the wire feed mechanism 14 during the time interval between t1 and t3, and one end of the next expected intermediate removal region of the wire 1 is located in corresponding relation to the front ends of the intermediate stripping cutters 121.

Figure 15:
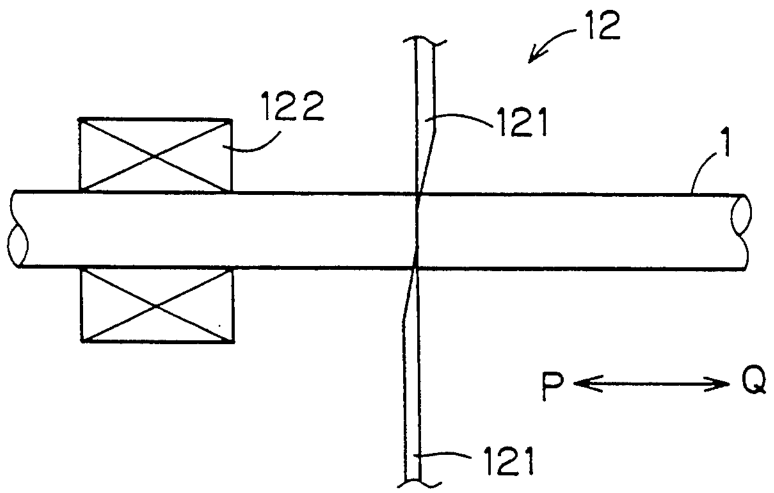
FIGS. 15 and 16 illustrate an intermediate stripping process in the harness fabricating apparatus of FIG. 1.

(5) The intermediate stripping mechanism 12 waits for operation preparation (stand-by time tw) from the time t3 immediately after the completion of the wire delivery to a time t4. The intermediate stripping process starts at the time t4. Referring to FIG. 15, the clamp 122 of the intermediate stripping mechanism 12 grasps the wire 1, and the cutters 121 are closed to cut in the outer periphery of the insulation 1*b* at one end of the intermediate removal region.

Figure 16:
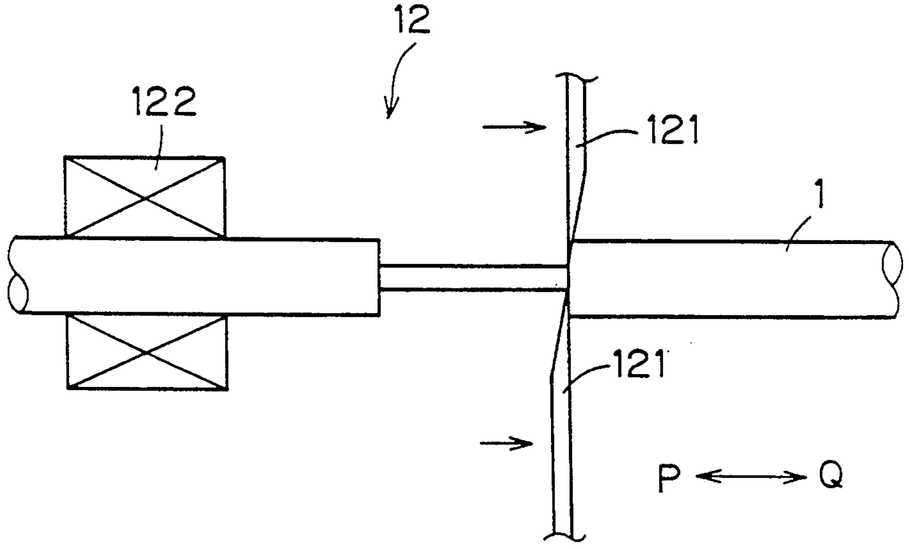

With the cutters 121 cutting in, the cutters 121 move in the direction of the arrow Q toward the other end of the intermediate removal region as shown in FIG. 16. This permits the insulation 1*b* in the intermediate removal region to be cut apart from the residual insulation 1*b* at the one end and to be compressed toward the other end. The insulation 1*b* in the intermediate removal region is removed. This completes the intermediate stripping process (time t5).

(6) At a time t6, after feeding the wire 1 of an amount corresponding to the cut-off length L1 by means of the draw rollers 16 during the time interval between t2 and t6, the pair of draw rollers 16 stop rotating and are separated from each other, thereby completing the feed of the wire 1 by means of the draw rollers 16 (FIG. 2). This eliminates the slack of the wire 1 formed between the two guide rollers 151, 152 of the wire guide mechanism 15. In this manner, the wire 1 is fed an amount of the cut-off length from the front clamp 17 toward the rear clamp 19, whereby the next expected cut-off position of the wire 1 is located in corresponding relation to the forward ends of the cut-off cutters 181 of the cutter mechanism 18.

This completes one-cycle operation. Subsequently, the above stated operation is repeated to sequentially fabricate the harnesses 10 having the terminals 10*a* crimped to their opposite ends and the insulation 1*b* removed in the intermediate region 10*b*.

According to the harness fabricating apparatus of the present invention, the wire path length adjusting mechanism 13 for freely setting the wire path length between the wire feed mechanism 14 and the intermediate stripping mechanism 12 is provided therebetween to set the wire path length so that the arrangement distance L3 of the wire 1 from the cut-off position for the cut-off cutters 181 to the cut-in position for the intermediate stripping cutters 121 equals the sum of an integral multiple of the cut-off dimension L1 of the wire 1 and the dimension L2. Thus, one feeding operation of the wire 1 in corresponding relation to the cut-off dimension (L1) by the wire feed mechanism 14 (and the draw rollers 16) within one cycle permits both positioning of the wire 1 corresponding to the cut-off cutters 181 and positioning thereof corresponding to the intermediate stripping cutters 121. The wire feed mechanism 14 is required to execute only one feeding operation and one stopping operation within one cycle, thereby contributing to reduction in process steps. Also required is one stand-by time tw between stopping the wire feed mechanism and starting the next process, thereby reducing time required for one cycle and providing efficient fabrication of the harnesses 10. These operations executed automatically provide stable harness quality and require no wire delivery process between the intermediate stripping operation and terminating operation to reduce the number of process steps.

Figure 18:
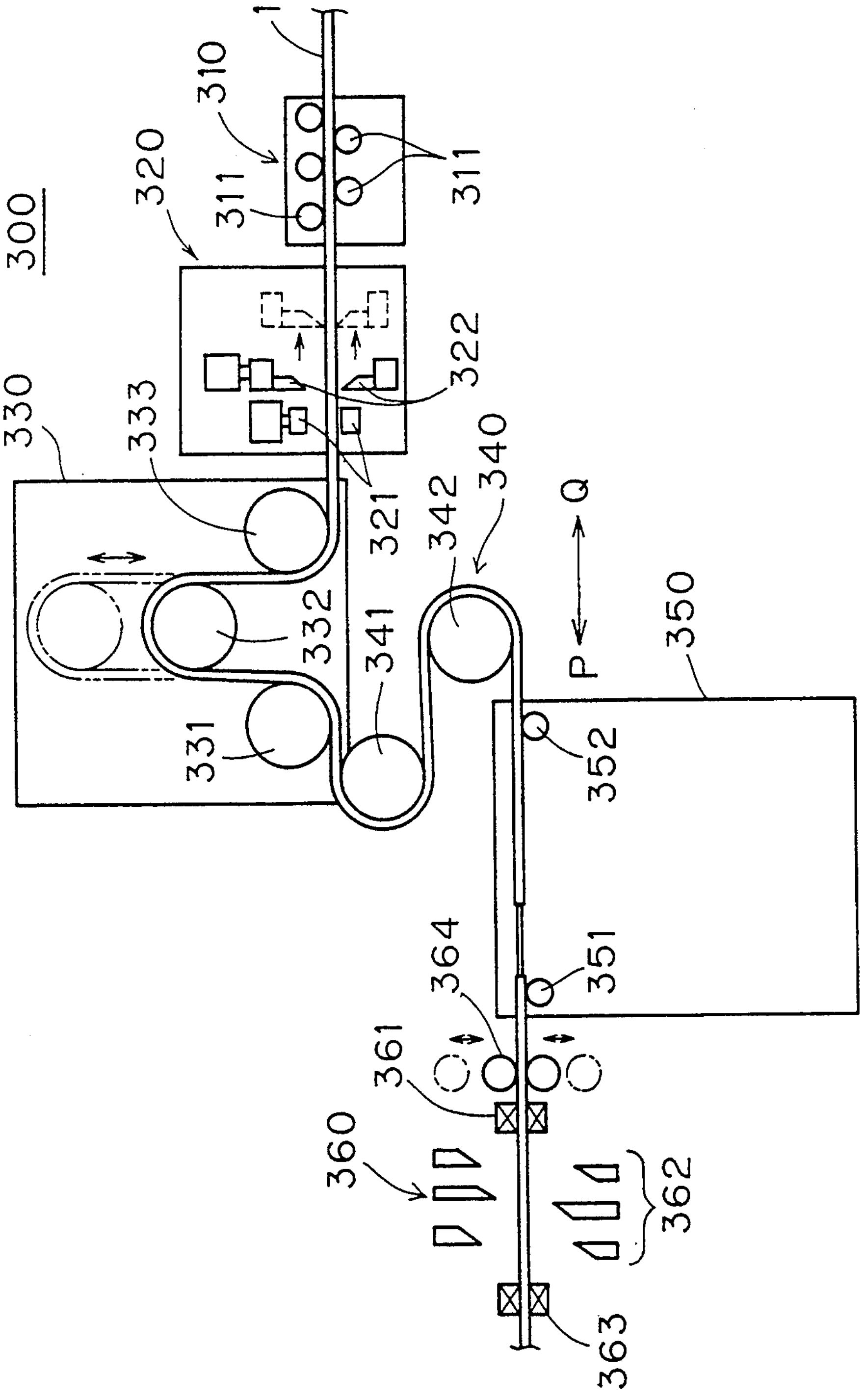
FIG. 18 is a schematic side view of a harness fabricating apparatus that is the background of the present invention.

Further, as compared with the prior art wire path length adjusting mechanism 330 of FIG. 18, the larger radius of curvature of the upper and lower reels 131, 132 readily prevents curls of the wire 1, and the width of the wire path length adjusting mechanism 13 is reduced in the wire arrangement line X direction because it requires the width of one circular reel. Since only the semicircular upper reel moves vertically, the drive is neither large-scaled nor costly.

Although the intermediate stripping is carried out by cutting in the insulation 1*b* at the front end (cut-in position M) of the intermediate removal region of the wire 1 with the cutters 121 and then moving the cutters 121 in the Q direction in the first preferred embodiment, the intermediate stripping may be carried out by cutting in the insulation 1*b* at the rear end of the intermediate removal region of the wire 1 with the cutters 121 and then moving the cutters 121 in the P direction.

Alternatively, the insulation 1*b* in the intermediate removal region of the wire 1 may be scored longitudinally of the wire 1 and be cut crosswise at opposite ends of the score to completely remove the insulation 1*b*.

The wire path length adjusting mechanism 13 need not necessarily be located between the intermediate stripping mechanism 12 and the wire feed mechanism 14 but should be between the intermediate stripping mechanism 12 and the cutter mechanism 18 (wire terminating mechanism).

In the first preferred embodiment, the restricting pins 134*b* of the upper reel 131 are manually extended and retracted by manipulating the handle whereas the restricting pins 134*b* of the lower reel 132 are automatically extended and retracted by the actuator 134*f*. However, the restricting pins 134*b* of the upper reel 13 1 may be extended and retracted automatically by using an actuator. Conversely, both the upper and lower reels 131, 132 may be manually operated by manipulating the handle. Further, although the single retentive member 143*c* holds the respective presser rollers 143*a*, 143*b* in the first preferred embodiment, the pressure contact device 143 may comprise independent retentive members for holding the presser rollers 143*a*, 143*b* respectively and a suitable restricting means for restricting the amount of movement of the retentive members so that the presser rollers 143*a*, 143*b* do not contact the core wire 1*a* of the intermediate stripped portion 10*b*.

Figure 17:
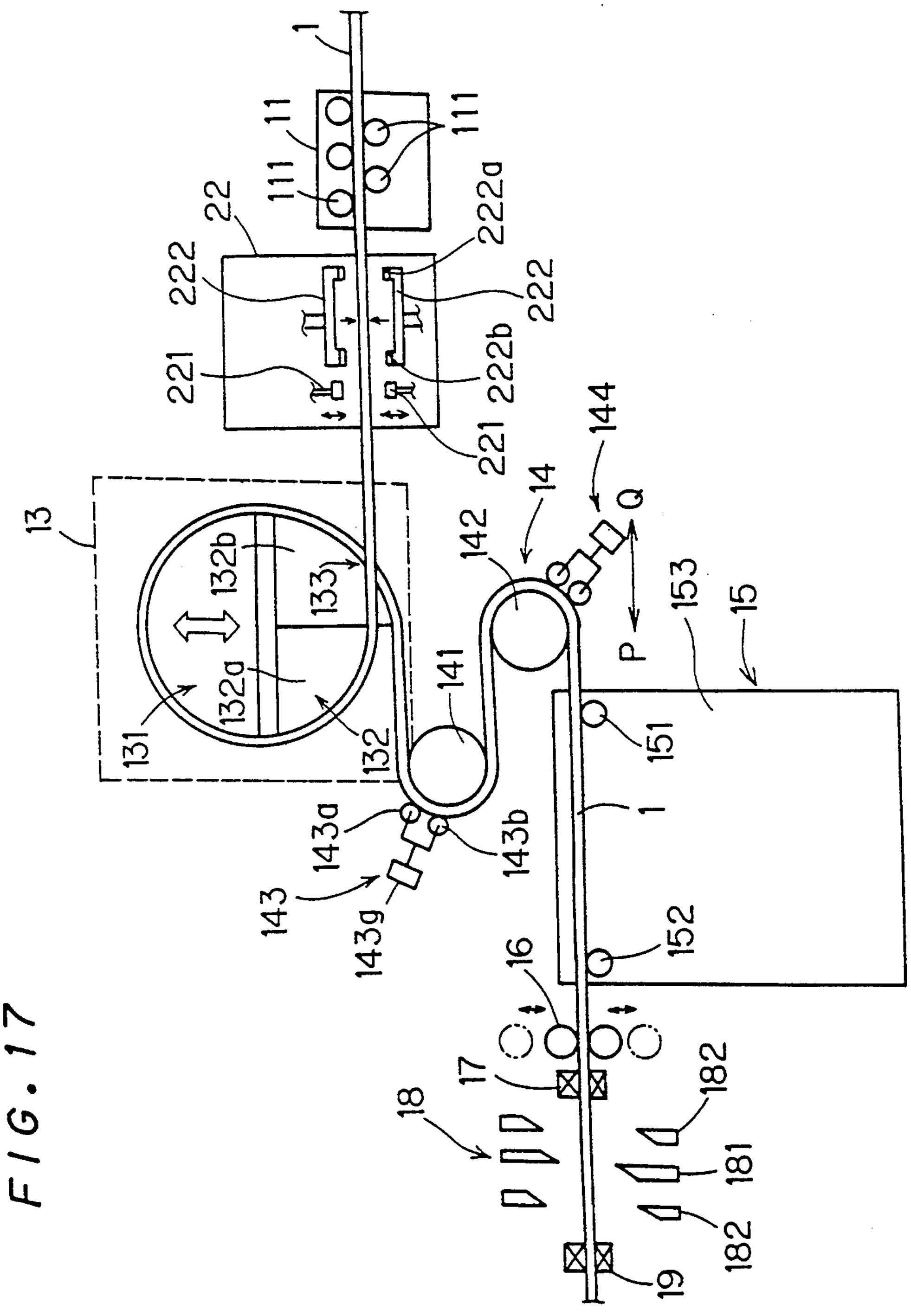
FIG. 17 is a schematic side view of the harness fabricating apparatus of a second preferred embodiment according to the present invention.

In the first preferred embodiment, the intermediate stripping mechanism 12 is provided as the first processing means. The present invention, however, is not so limited. A marking mechanism 22 may be provided as the first processing means as shown in FIG. 17 according to a second preferred embodiment of the present invention. The marking mechanism 22 comprises a clamp 221 driven by a drive means such as a cylinder not shown for releasably grasping the wire 1 on the wire arrangement line X, and a pair of marking tools 222 arranged above and below the wire arrangement line X. Opposed marking heads 222*a*, 222*b* made of felt are mounted on opposite side pieces of the pair of marking tools 222 in predetermined spaced relation. A colorant supply means not shown constantly supplies a marking colorant to the respective marking heads 222*a*, 222*b*.

When the drive means such as a cylinder drives the pair of upper and lower marking tools 222 for movement toward each other, the marking heads 222*a*, 222*b* come in contact with the wire 1 in such a manner as to sandwich the wire 1 from above and below, to apply identification marks of the colorant to the outer surface of the wire 1. In this case, suitable adjustment of the distance between the marking mechanism 22 and the cutter mechanism 18 by the wire path length adjusting mechanism 13 allows the wire 1 to be positioned both at the cut-off position and in the marking mechanism 22 only by one feeding operation of the wire feed mechanism, thereby providing efficient harness fabrication.

For formation of a plurality of intermediate stripped portions in one harness, a plurality of intermediate stripping mechanisms are arranged along the wire arrangement line X and a plurality of wire path length adjusting mechanisms are arranged alternately with the intermediate stripping mechanisms. This enables the positioning corresponding to the cut-off cutters of the cutter mechanism and the positioning corresponding to the cutters of the intermediate stripping mechanisms at the same time only by feeding the wire once by means of the feed roller within one cycle. For provision of both the intermediate stripping mechanism and the marking mechanism, the wire path length adjusting mechanism may be provided between the marking mechanism and the intermediate stripping mechanism to freely set the wire path length between the work positions thereof. This increases the degree of freedom of wire processing.

In the preferred embodiment of FIG. 2, the wire path length adjusting mechanism 13 is adapted such that the substantially disc-shaped reel is divided into the upper and lower reels and the distance therebetween is varied to adjust the wire path length. It is possible to divide the disc-shaped reel into three and to vary the distances between the three divided reels for adjustment of the wire path length. The three-divided reel structure requires complicated drive means for the respective reels and an increased width of the reel in the wire arrangement line X direction. To adjust the wire path length within a limited planar space, it is preferred to divide the disc-shaped reel into two: the upper and lower reels as shown in FIG. 2 and to move one of the reels vertically.

While the invention has been shown and described in detail, the foregoing description is in all aspects illustrative and not restrictive. It is therefore understood that numerous modifications and variations can be devised without departing from the scope of the invention.

What is claimed is:

1. An apparatus for fabricating a harness by processing a wire, comprising:
  - wire feed means for intermittently feeding said wire 1n a predetermined amount in a longitudinal direction of said wire,
  - first processing means located upstream of said wire feed means in a feeding direction of said wire,
  - second processing means located downstream of said wire feed means in the feeding direction of said wire, and
  - wire path length adjusting means located between said first and second processing means for adjusting a wire path length of said wire between said first and second processing means,
  - said wire path length adjusting means including a disc-shaped reel around which said wire is wound,
  - said reel being divided into a plurality of divided reel elements,
  - said wire path length being freely adjusted by varying a distance between said divided reel elements.

2. The apparatus of claim 1, wherein said first processing means is an intermediate stripping mechanism for stripping an insulation from said wire 1n an intermediate region of said wire, and said second processing means is a cutter mechanism for cutting off said wire fed from said wire feed means.

3. The apparatus of claim 1,
  - wherein said reel being halved into a first divided reel element and a second divided reel element,
  - said apparatus further comprising a drive for adjusting a distance between said first and second divided reel elements.

4. The apparatus of claim 3, further comprising:
  - a machine body on which said first divided reel element is fixed, and
  - a moving member on which said second divided reel element is fixed,
  - said moving member being adjusted for movement toward and away from said machine body by said drive.

5. The apparatus of claim 4, further comprising:
  - a plurality of bearings spaced circumferentially of said reel along outer peripheries of said divided reel elements, said wire being wound on said plurality of bearings.

6. The apparatus of claim 5,
  - wherein said first divided reel element includes an inlet reel to which said wire is fed and an outlet reel from which said wire is fed,
  - wherein said wire fed to said inlet reel and said wire fed from said outlet reel intersect in three dimensions at an intersection, and
  - wherein a wire outlet surface provided on a side of said inlet reel from which said wire is fed and a wire inlet surface provided on a side of said second divided reel element to which said wire is fed lie substantially in the same plane, and a wire outlet surface provided on a side of said second divided reel element from which said wire is fed and a wire inlet surface provided on a side of said outlet reel to which said wire is fed lie substantially in the same plane.

7. The apparatus of claim 6, further comprising:
  - restricting members for preventing said wire from falling off and provided on heads of some of said plurality of bearings which are located in predetermined spaced relation circumferentially of said reel, and
  - restricting pins for preventing said wire from falling off and provided in predetermined spaced relation in positions outward in a radial direction of said reel from said bearings.

8. The apparatus of claim 7, wherein said restricting pins are retractable.

9. The apparatus of claim 8, wherein said first processing means is an intermediate stripping mechanism for stripping an insulation from said wire 1n an intermediate region of said wire, and said second processing means is a cutter mechanism for cutting off said wire fed from said wire feed means.

10. The apparatus of claim 8,
  - wherein said drive includes:
  - a drive motor mounted on said machine body,
  - a threaded shaft coupled to said drive motor and driven for rotation by said drive motor,
  - a rack in threaded engagement with said threaded shaft for holding said moving member, and
  - a guide rod disposed in parallel with said threaded shaft for guiding said rack in a longitudinal direction of said threaded shaft.

11. The apparatus of claim 10, further comprising:

an encoder for detecting the amount of rotation of said threaded shaft.

12. The apparatus of claim 11, wherein said first processing means is an intermediate stripping mechanism for stripping an insulation from said wire 1n an intermediate region of said wire, and said second processing means is a cutter mechanism for cutting off said wire fed from said wire feed means.

13. The apparatus of claim 1, wherein said first processing means is a marking mechanism for marking an outer peripheral surface of said wire, and said second processing means is a cutter mechanism for cutting off said wire fed from said wire feed means.

14. A method of fabricating a harness, comprising the steps of:

intermittently feeding a wire 1n a predetermined amount in a longitudinal direction thereof by wire feed means, performing a first processing on said wire by first processing means located upstream of said wire feed means in a feeding direction of said wire, and performing a second processing on said wire by second processing means located downstream of said wire feed means in the feeding direction of said wire, wherein a wire path length of said wire between said first processing means and said second processing means is adjusted by wire path length adjusting means provided between said first and second processing means so as to simultaneously execute positioning of said wire 1n said first processing means and positioning of said wire 1n said second processing means, for execution of said first processing and/or said second processing, wherein said wire path length adjusting means includes a disc-shaped reel divided into a plurality of divided reel elements around which said wire is wound, and said wire path length is adjusted by varying a distance between said divided reel elements.

15. The method of claim 14, wherein said first processing means is an intermediate stripping mechanism for stripping an insulation from said wire 1n an intermediate region of said wire, and said second processing means is a cutter mechanism for cutting off said wire fed from said wire feed means.

* * * * *